US012754576B2

(12) United States Patent
Clark

(10) Patent No.: US 12,754,576 B2
(45) Date of Patent: Oct. 6, 2026

(54) TRANSFORMER-HYBRID VARIABLE REACTANCE

(71) Applicant: Richard V. Clark, Newport Richey, FL (US)

(72) Inventor: Richard V. Clark, Newport Richey, FL (US)

(73) Assignee: Clark Power Systems, Inc., Odessa, FL (US)

( * ) Notice: Subject to any disclaimer, the term of this patent is extended or adjusted under 35 U.S.C. 154(b) by 421 days.

(21) Appl. No.: 17/803,814

(22) Filed: Dec. 8, 2022

(65) Prior Publication Data

US 2024/0195169 A1 Jun. 13, 2024

(51) Int. Cl.

*G05F 1/12* (2006.01)
*G05F 1/32* (2006.01)
*H01F 29/14* (2006.01)

(52) U.S. Cl.

CPC .................. *G05F 1/12* (2013.01); *G05F 1/32* (2013.01); *H01F 29/14* (2013.01)

(58) Field of Classification Search

CPC ..... G05F 1/12; G05F 1/40; G05F 1/45; G05F 1/22; G05F 1/32; G05F 1/33; G05F 1/34; G05F 1/38; H02M 1/14; H02M 1/12
USPC ................................. 323/249, 240, 261, 254
See application file for complete search history.

(56) References Cited

U.S. PATENT DOCUMENTS 3,343,074 A 9/1967 Brock
3,432,739 A * 3/1969 Kauffman ................. G05F 1/38 363/94
3,505,588 A 4/1970 Brock
4,933,624 A * 6/1990 Kumar .................... G05F 1/455 323/344
5,469,045 A * 11/1995 Dove .................... H02J 3/1892 323/210
5,521,810 A 5/1996 Yamaguchi
5,563,782 A 10/1996 Chen
5,789,907 A 8/1998 Casagrande
6,331,765 B1 * 12/2001 Yamamoto ................ G05F 1/70 323/210
7,839,254 B2 11/2010 Dinsmore
8,816,808 B2 8/2014 Maclennan
9,192,124 B1 11/2015 Behnike
10,048,708 B2 8/2018 Bezos et al.
10,353,412 B2 7/2019 Bezos et al.
10,984,985 B2 4/2021 Mavretic
11,069,470 B1 7/2021 Ward
11,507,118 B2 11/2022 Daley
(Continued)

*Primary Examiner* — Gustavo A Rosario-Benitez
(74) *Attorney, Agent, or Firm* — Griffin C. Klema

(57) ABSTRACT

A device that improves electrical power and current flow between source and load using a combination of solid state semiconductor and variable impedance technologies with reduced weight and lower energy loss. A variable impedance regulator circuit is disclosed, in combination with a DC saturable transformer core and coil, that when activated keeps current spikes and abnormal flows within the circuit from occurring. The disclosure reduces nuisance tripping of circuit protection devices. The disclosure further provides semiconductor heat sinks, single and double sided, and a new transformer coil-type heat exchanger. The disclosure provides a new and improved hybrid variable reactance transformer (HVRT) which carries heat away in an extremely compact package.

8 Claims, 7 Drawing Sheets

(56) References Cited

U.S. PATENT DOCUMENTS

| | | | | |
|---|---|---|---|---|
| 11,976,376 | B2 | 5/2024 | Guskov | |
| 2002/0191418 | A1* | 12/2002 | Clayton | H02M 3/33507 363/17 |
| 2006/0086716 | A1* | 4/2006 | Korecki | G05D 23/1913 219/507 |
| 2012/0250370 | A1* | 10/2012 | Taniguchi | H02M 3/33561 363/34 |
| 2014/0176088 | A1* | 6/2014 | Eckhardt | H02J 3/50 323/207 |
| 2015/0357814 | A1* | 12/2015 | Rozenshtein | H01F 6/06 505/211 |
| 2016/0359326 | A1* | 12/2016 | Sun | H02J 3/1878 |
| 2017/0077799 | A1* | 3/2017 | Wang | H02M 7/217 |
| 2018/0145242 | A1* | 5/2018 | Tamayama | H10N 30/40 |
| 2019/0044377 | A1* | 2/2019 | Toyoda | H02J 9/062 |
| 2019/0165614 | A1* | 5/2019 | Afridi | H02J 50/12 |

* cited by examiner

TRANSFORMER-HYBRID VARIABLE REACTANCE

BACKGROUND OF THE INVENTION

This invention relates to an electrical transformer that incorporates a unique combination of transformer, semiconductor and saturable DC coil technology to regulate and control precise power to an electrical load without failure. Controllable transformers are used in a variety of ways to vary voltage and current from a source to an electrical load. In prior arts, U.S. Pat. Nos. 3,343,074 and 3,505,588 utilize a variable reactance transformer (VRT) to achieve this. A major drawback with this technology is the electrical efficiency, size and weight of the device. Typical VRT's have an overall electrical efficiency of 70 to 80 percent as compared to the new invention which is 85 to 90 percent. Another major improvement is size and weight. The device mentioned is 33 to 50 percent lighter and requires 25-30 percent less space. All measurements are in reference to the total amount of electrical power (kilowatts) being converted. All features result in lower utility, installation and shipping costs. This is a direct savings to the end user. Other prior Art patents such as 10,048,708 B2, 10,353,412 and 10,984,985 do not address these issues.

SUMMARY OF INVENTION

The present invention is directed to a self-contained transformer that utilizes semiconductors, electronic regulators, and transformer windings to produce greater electrical efficiencies and reliability. The device comprises, in combination of a thermally efficient semiconductor heat sink, voltage, current and impedance regulators, external references, a main magnetic transformer core with primary, secondary and saturable DC core windings.

The device works by first receiving an input command or reference from an external source. It then compares and sums the reference sources to the voltage, current and impedance feedback signals produced by devices in the main power circuit. An error signal within the circuitry is produced which then advances or retards a main power semiconductor. The semiconductor which now starts to advance conduct, supplies variable/proportional voltage and current to the load through the main transformer and DC core windings. The electronic circuit is satisfied when the difference between the error and feedback signals are equal. Hence, power regulation is achieved. During this period the current limit and saturable DC core windings are working in tandem to ensure smooth limited current flow and thus reliable, regulated and efficient power is now transferred from source to load. The heat produced from the semiconductor is absorbed through a strategically placed and specially designed heat sink that can be an integral part of the main transformer. It yields a smaller lighter package than conventional VRT's of an equal power level. The cooling medium, which flows through the heat sink also flows and carries heat away from the magnetic core and windings of the transformer. The cooling agent can be in a liquid or vapor form.

DESCRIPTION OF THE PREFERRED EMBODIMENTS

Figure 1:
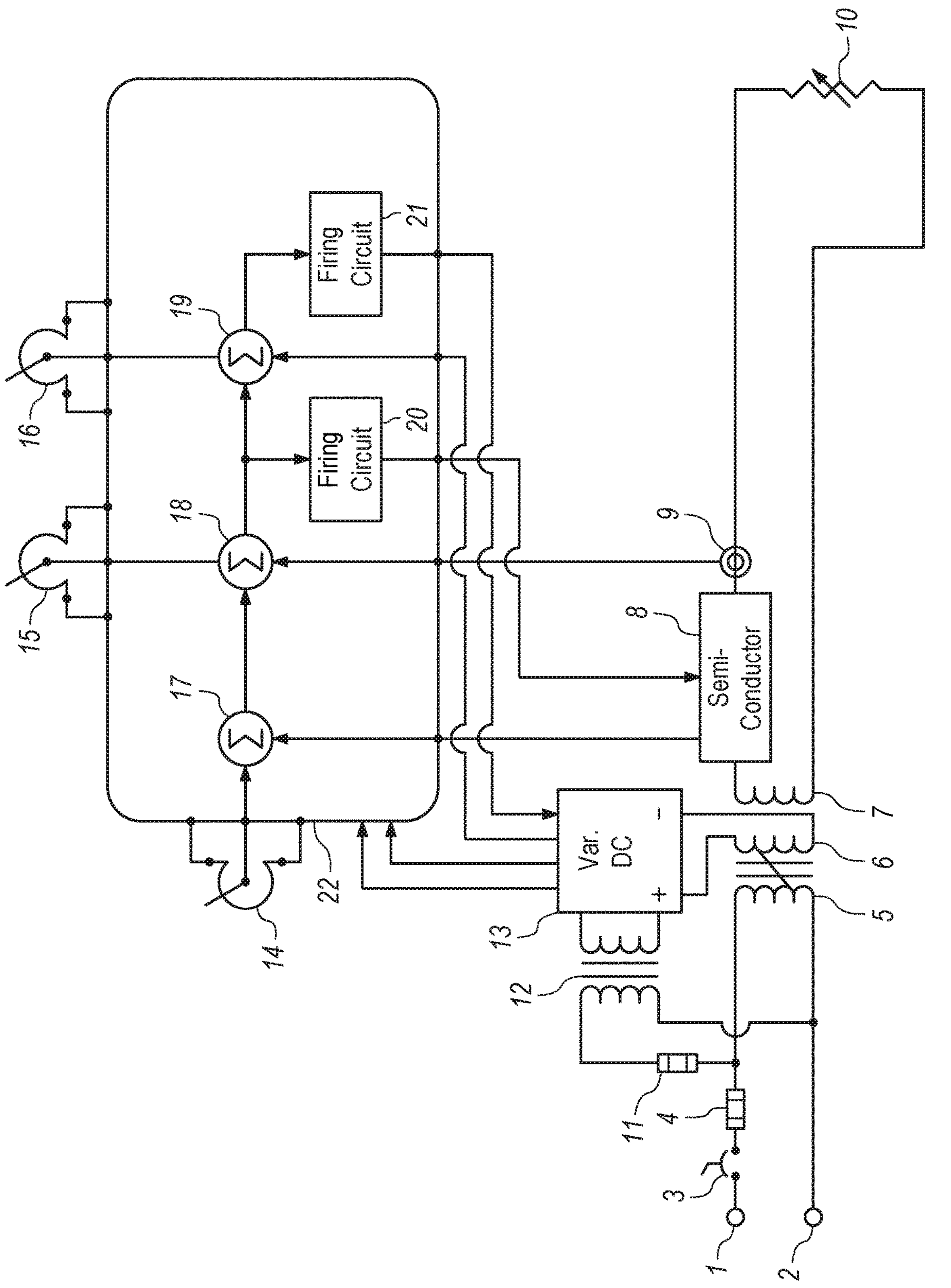
FIG. 1 is a schematic view of the hybrid variable reactance transformer (HVRT) with the semiconductor located in the secondary according to an embodiment of the invention.

Turning now to a more detailed consideration of the present invention, in FIG. 1, an AC power source is applied to terminals 1 and 2. It then powers the primaries of transformers 5 and 12 through circuit protection 3, 4 and 11. Transformer 12, which is now energized, provides secondary power to a variable DC rectifier which provides current to reactor coil 6. The variable DC rectifier 13 also provides AC power to board 22 on which the hybrid variable reactance transformer (HVRT) regulators reside. Upon receiving a voltage command reference from 14, it is compared and summed at summing junction 17 with feedback from 8. The difference, or error produced gets compared and summed at summing junction 18 with current reference 15 and feedback 9. The error produced then get compared and summed at 19 with the impedance reference 16 and feedback from variable DC rectifier 13. The error from output 18 drives firing circuit 20 which provides a phase angle conduction signal to semiconductor 8. Semiconductor 8 is a pair of inverse parallel SCR's located in secondary coil 7. The main secondary output coil 7, which is now energized, starts to transfer regulated voltage and current to AC load 10. If the current levels approach the reference 15, and error signal 18 exceeds the impedance reference 16, then the output of summing junction 19 starts to drive firing circuit 21. The variable DC power supply, which gets its inversely proportional conduction signal from the output of firing circuit 21, starts retarding or advancing DC current flowing in reactor coil 6. The DC current that flows increases or decreases the primary 5 to secondary 7 impedance. This impedance change acts as an additional current buffer which keeps primary AC current flowing in primary coil 5 smooth and limited to the extent that circuit breaker 3 and fuse 4 will not trip or blow. This scenario is also known as nuisance tripping. Nuisance tripping can cause power interruption to load 10 which may result in major production, part and electrical energy losses.

Figure 2:
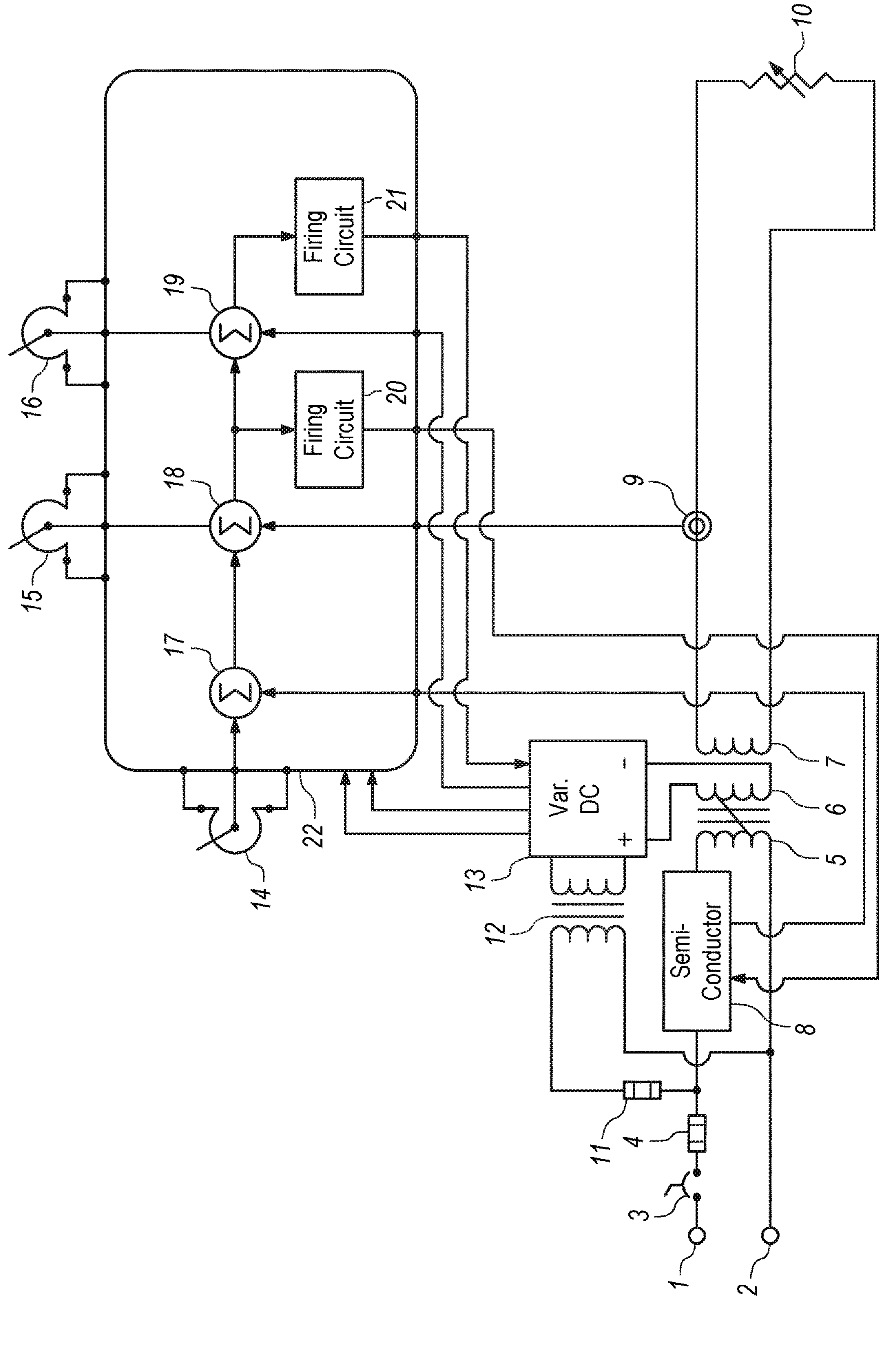
FIG. 2 is a schematic view of the hybrid variable reactance transformer with the semiconductor located in the primary according to an embodiment of the invention.

In FIG. 2 shows an another embodiment of a hybrid variable reactance transformer. An AC power source is applied to terminals 1 and 2. It then powers the primary transformer 12 through circuit protection 3, 4, and 11. Transformer 12, which is now energized, provides secondary power to variable DC rectifier 13 which provides current to reactor coil 6. It also provides AC power to board 22 on which the hybrid variable reactance transformer (HVRT) regulators reside. Upon receiving a voltage command reference from 14, it is compared and summed at summing junction 17 with feedback from 8. The error produced gets compared and summed at summing junction 18 with current reference 15 and feedback 9. The error produced then get compared and summed at summing junction 19 with the impedance reference 16 and feedback from 13. The error from output summing junction 18 drives firing circuit 20 which provides a phase angle conduction signal to semiconductor 8. Semiconductor 8 is a pair of inverse parallel SCRs located in the primary of 5. The main secondary output coil 7, which is now energized, starts to transfer regulated voltage and alternating current to load 10 if the current levels approach the reference 15 and error signal 18 exceeds the impedance reference 16, then the output of 19 starts to drive firing circuit 21. The variable DC power supply, which gets its inversely proportional conduction signal from the output of 21, starts retarding or advancing direct current flowing in reactor coil 6. The DC current that flows increases or decreases the primary 5 to secondary 7 impedance. This impedance change acts as an additional current buffer which keeps primary current flowing in 5 smooth and limited to the extent that circuit breaker 3 and fuse 4 will not trip or blow. This scenario is also known as nuisance tripping. Nuisance tripping can cause power interruption to load 10 which may result in major production, part and electrical energy losses.

Figure 3:
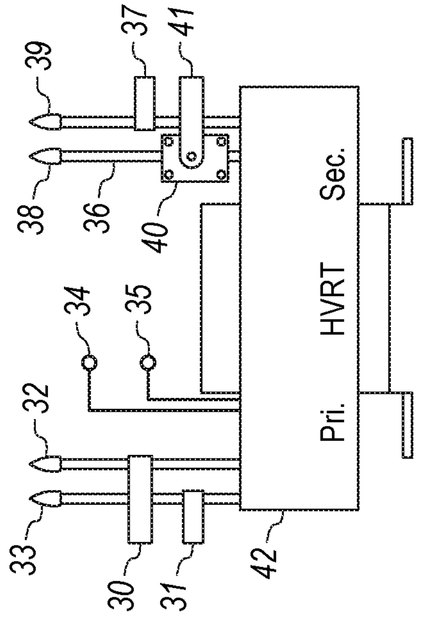
FIG. 3 is a partial diagrammatic illustration showing the HVRT, single sided secondary heat sink and coolant flow thereof.

In FIG. 3, a partial diagrammatic illustration shows an HVRT 42 windings, single sided heat sink, and cooling components. The primary coil winding start lead is 30 and finish is 31, each having a respective bus bar. The reactor DC coil winding start lead is 34 and finish is 35. The secondary coil winding start lead is 36 with semiconductor lead at 41, and finish at bus bar 37. The coolant enters at 38 and starts flowing through the semiconductor single-sided heat sink 40, then into the secondary coil and exits at 39. Coolant also flows through the primary coil starting at 32 and then exits at 33. The heat produced from the semiconductor heat sink 40 and HVRT 42 when under electrical load is absorbed by the coolant and discharged accordingly. It is important to note that winding conductors for both the primary and secondary are hollow inside for coolant to run through.

Figure 4C:
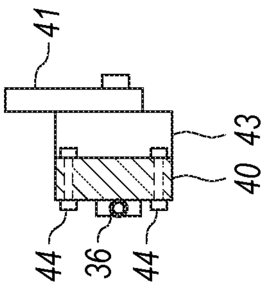
FIGS. 4A, 4B, and 4C are detailed views of the single sided heat sink and semiconductor attached.
Figure 4B:
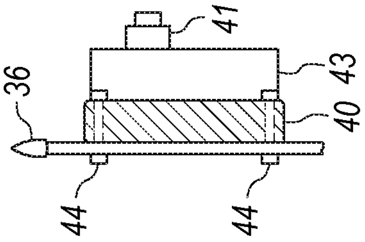
Figure 4A:
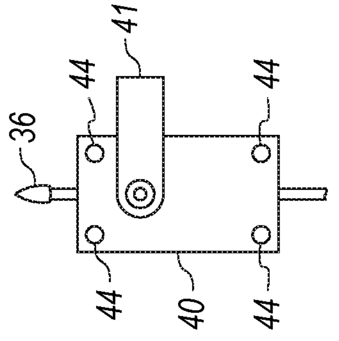

In FIGS. 4A, 4B, and 4C, detailed views of the single-sided semiconductor heat sink are shown. In this embodiment, the heat sink 40 is an integral part of an HVRT. The semiconductor 43 is fastened to heat sink 40 by four bolts 44, and having bus bar 41 in electrical communication with the winding lead 36 on the opposite side of the heatsink 40, each bolt being torqued to the proper specification. Coolant line and hollow conductor 36 is bonded to the heat sink 40 so that maximum thermal energy can be transferred into the flowing coolant, thus keeping the semiconductor cool while under full electrical load. Semiconductor lead 41 provides a connection point to complete the secondary load circuit.

Figure 5:
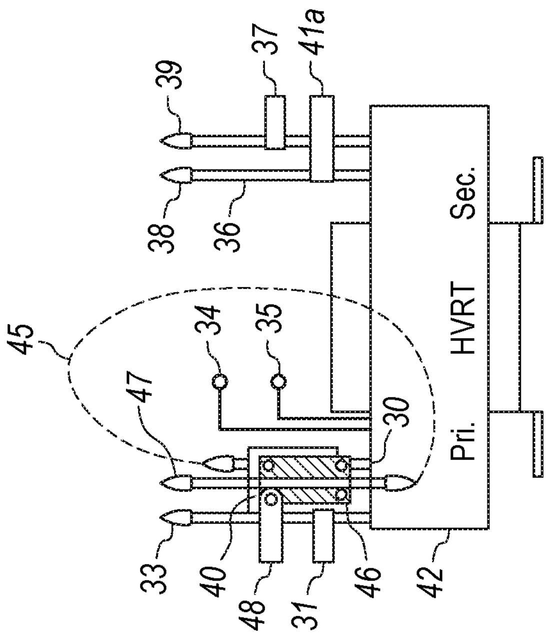
FIG. 5 is a partial diagrammatic illustration showing the HVRT, double sided primary heat sink and coolant flow thereof.

In FIG. 5, a partial diagrammatic illustration show another embodiment of an HVRT 42, with windings, double sided heat sinks 40 and 46 and cooling components. The input power lead 48 (bus bar) is connected to one side of heat sink 46, and electrically connected to the semiconductor. The semiconductor is located in between the opposing heat sinks 40 and 46, transferring electrical power to the primary coil winding, through start lead 30 and finish lead connected to bus bar 31. The reactor DC coil winding start lead is 34 and finish is 35. The secondary coil winding start lead is 36, with bus bar 41*a* connected thereto, and finish lead with bus bar 37. The heat produced from the semiconductor heat sinks 46 and 40, and HVRT 42 when under electrical load, is absorbed by the coolant and discharged accordingly. In this embodiment, the winding conductors on both the primary and secondary sides, with leads/ends 30, 31, 36 and 37, are hollow inside, allowing coolant to run through the winding conductors. Non-conductive piping or hose 45 may be provided to connect to the coolant of the primary winding to additionally cool the heat sinks 40 and 46 of the semiconductor attached to the primary winding lead 30, creating a continuous loop of coolant from 33 to 47, cooling both the primary winding and semiconductors. Coolant on the secondary side flows between 38 and 39*a*.

Figure 6C:
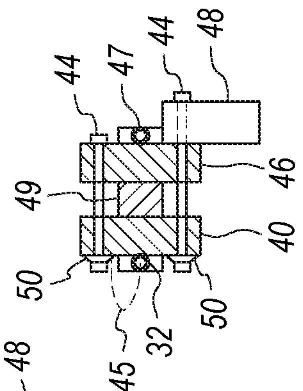
FIGS. 6A, 6B, and 6C are detailed views of the double sided heat sink and semiconductor attached.
Figure 6B:
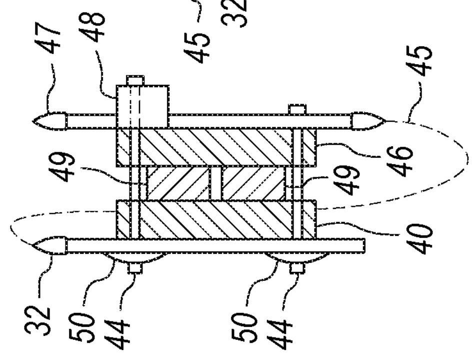
Figure 6A:
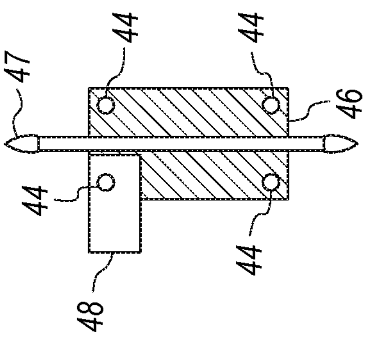

In FIGS. 6A, 6B, and 6C, detailed views of the double sided semiconductor heat sink are shown. The two heat sinks 40 and 46 with semiconductor 49 in between. In this embodiment, the heat sinks are an integral part of HVRT 42. Semiconductor 49 is held between the two plates by insulated fasteners 44. The four bolts 44 with insulating washers 50 are all torque to the proper specification. An electrically insulated hose 45 connects coolant flow from 47, through and into 32 to cool the semiconductor itself. Coolant lines 47 and 32 are each respectively bonded to their conductive heat sink plates 46 and 40 so that maximum thermal energy can be transferred into the flow of the coolant, thus keeping the semiconductor cool while under full electrical load. Conductor lead 48 provides a connection point to complete the electrical circuit.

Figure 7A:
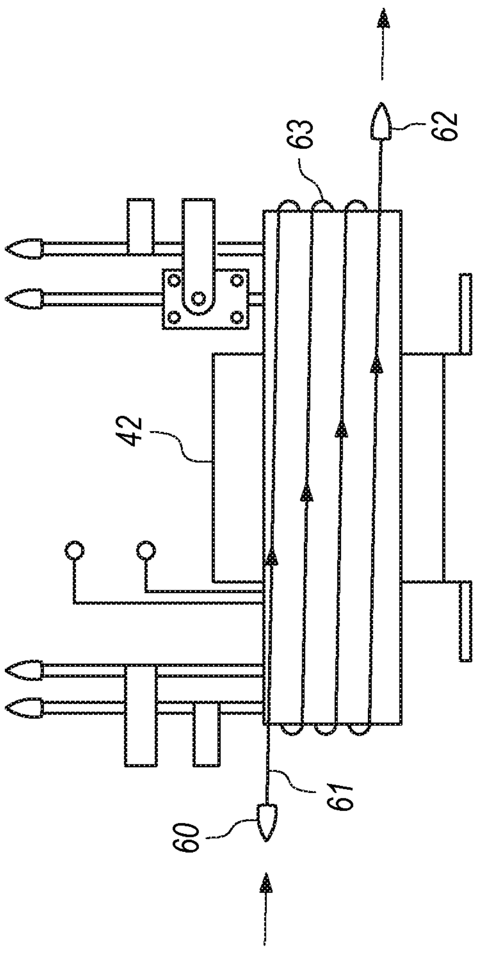
FIG. 7 is a detailed illustration high temperature tubing wrapped around the HVRT for the purpose of an additional cooling.
Figure 7B:
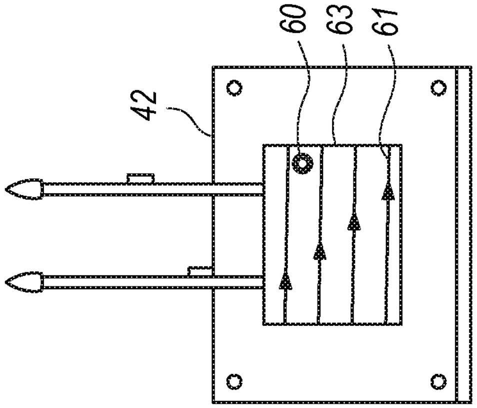
Figure 7C:
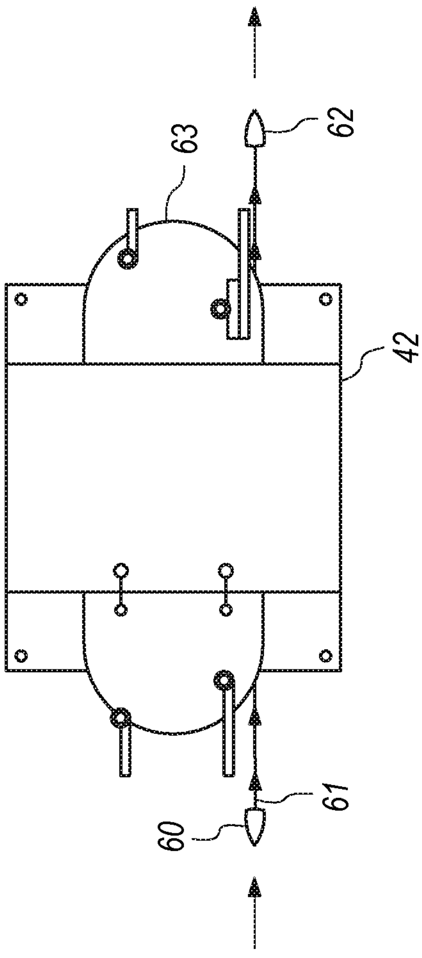

In FIGS. 7A, 7B, and 7C, illustrations are shown comprising a high temperature tube 61 for coolant to flow through. It provides additional cooling to HVRT 42 winding and core, if required. The arrangement is such that coolant enters a fitting at 60. As it travels thru tube 61, it extracts thermal energy released during transformer electrical loading. The number of turns is calculated and determined by the power level (in kilowatts), flux core density, winding impedances, flow and type of coolant, maximum ambient and HVRT 42 temperatures and type of bonding agent 63. The heat that is absorbed by the coolant gets discharged at fitting 62.

Figure 8:
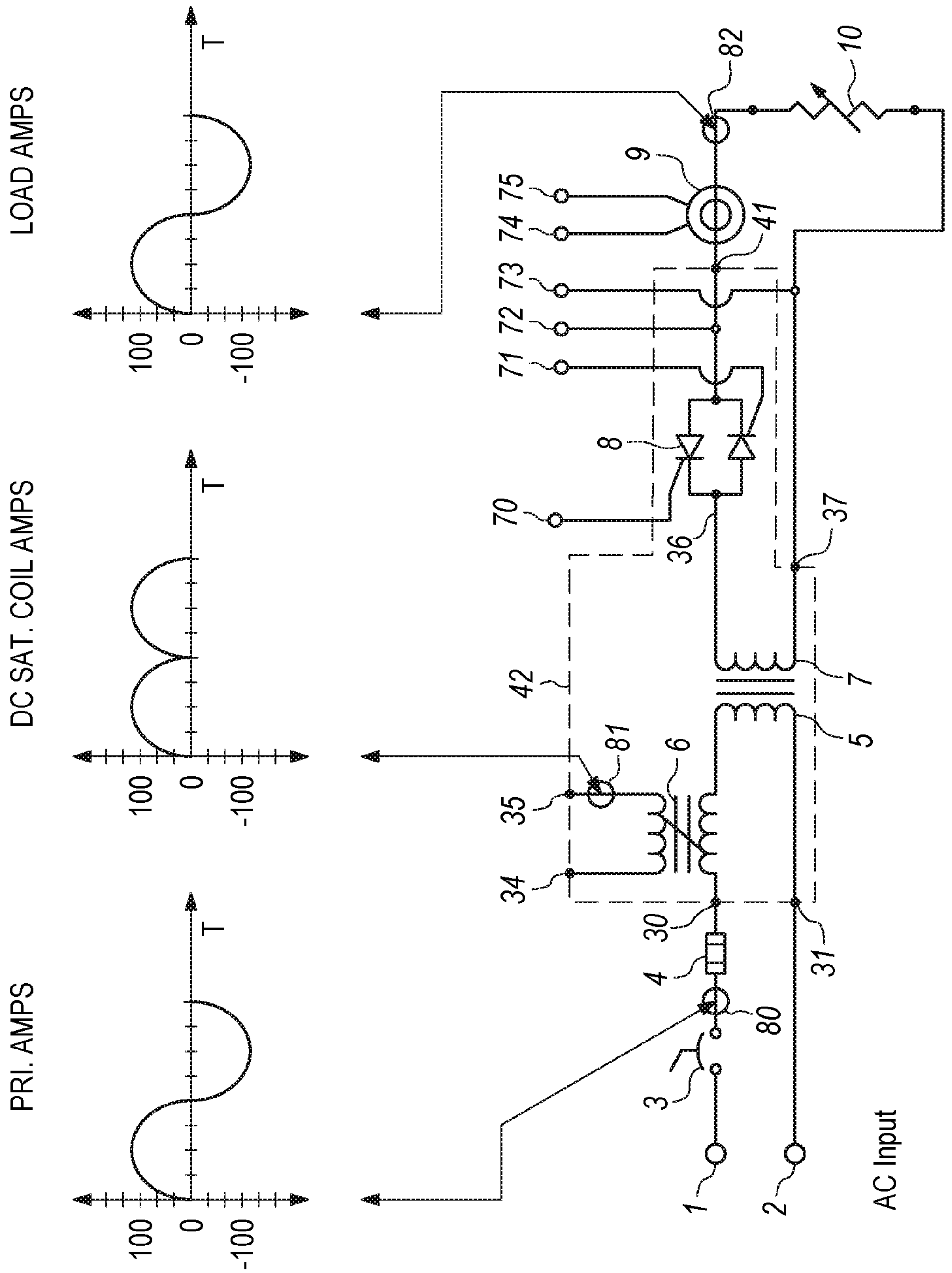
FIG. 8 is an equivalent electrical schematic view of the HVRT transformer with secondary semiconductors and wave forms at normal operating conditions.

FIG. 8 shows an equivalent electrical schematic view of an embodiment of an HVRT transformer 42 with secondary semiconductors and waveforms under normal loading conditions with AC power applied to the source at 1 and 2. More specifically, the semiconductors located in the secondary side of HVRT are a set of inverse parallel connected SCR's 8 with the input 36 and output 41. When firing pulses are applied to gates 70 and 71, a phase angle controllable current sine wave output is produced. Depending on the command signal input, the voltage feedback signal 72 to 73 and current limit setting and current feedback signal 74 and 75 from the current transformer 9 will determine the exact phase angle for voltage, current and power to be delivered to load 10. In this depiction, the command input from potentiometer is 100 percent. Current limit potentiometer is at 100 percent and impedance potentiometer is at zero percent, then the current waveforms at points 80 and 82 will be pure sinusoidal at full load output, as shown in the corresponding waveform graphs. The current ratio is determined by the turn ratio of coils 5 and 7. For this illustration it is set at one to one (1:1). The saturable DC coil current 81, which produces no impedance change in 6, is full on or at zero percent. The maximum impedance range of change is set by the turn ratio of DC coil 34 and 35. In this case, zero DC current will yield an impedance change across reactor coil 6 of 10 percent and full on is zero. The DC reactor coil current is inversely proportional to the percent impedance across element 6 in the primary circuit. 3 is a circuit breaker. 4 is a fuse. 30 and 31 are the main connection points to the primary input. 37 and 41 are the secondary connection points for the output.

Figure 9:
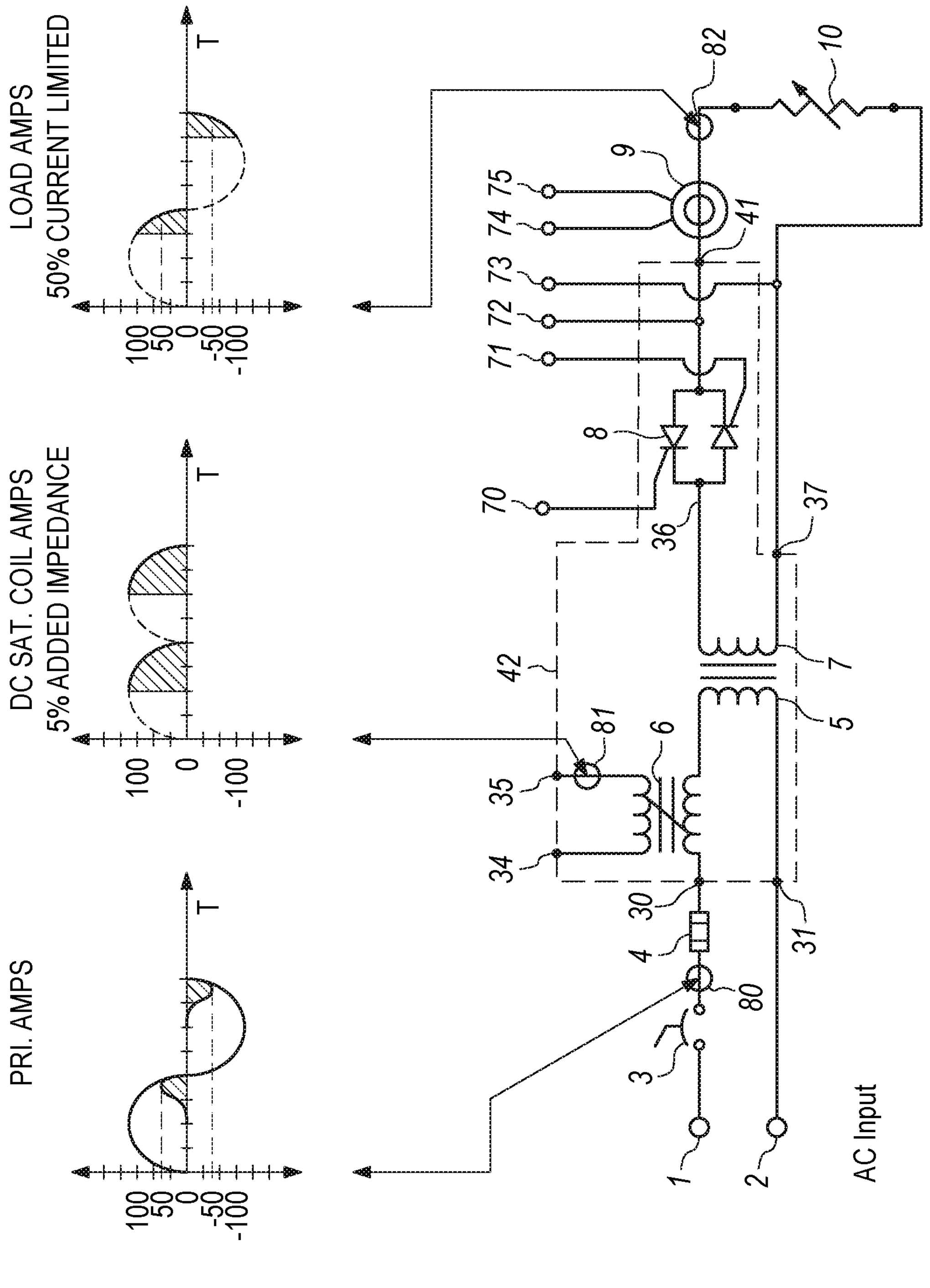
FIG. 9 is the same as FIG. 8 above but at 50 percent current limited, impedance applied conditions.

FIG. 9 is in a normal operating condition but in a current-limited impedance applied capacity. The command voltage input potentiometer is 100 percent, while current limit potentiometer and impedance potentiometer are both set at 50 percent. As shown, the current peak or spike observed flowing at point 82 is slightly above the 50 percent threshold due to the non-linear nature of phase angle conduction of the semiconductor SCR's 8 and feedback at coil 9. However, when reflected into the primary, the saturable reactor coil 6, which has now increased its impedance by 5 percent, smooths the current spike out, as shown at point 80, thus keeping current flowing to the limited 50 percent required. This prevents the nuisance tripping of components circuit breaker 3 and fuse 4.

Figure 10:
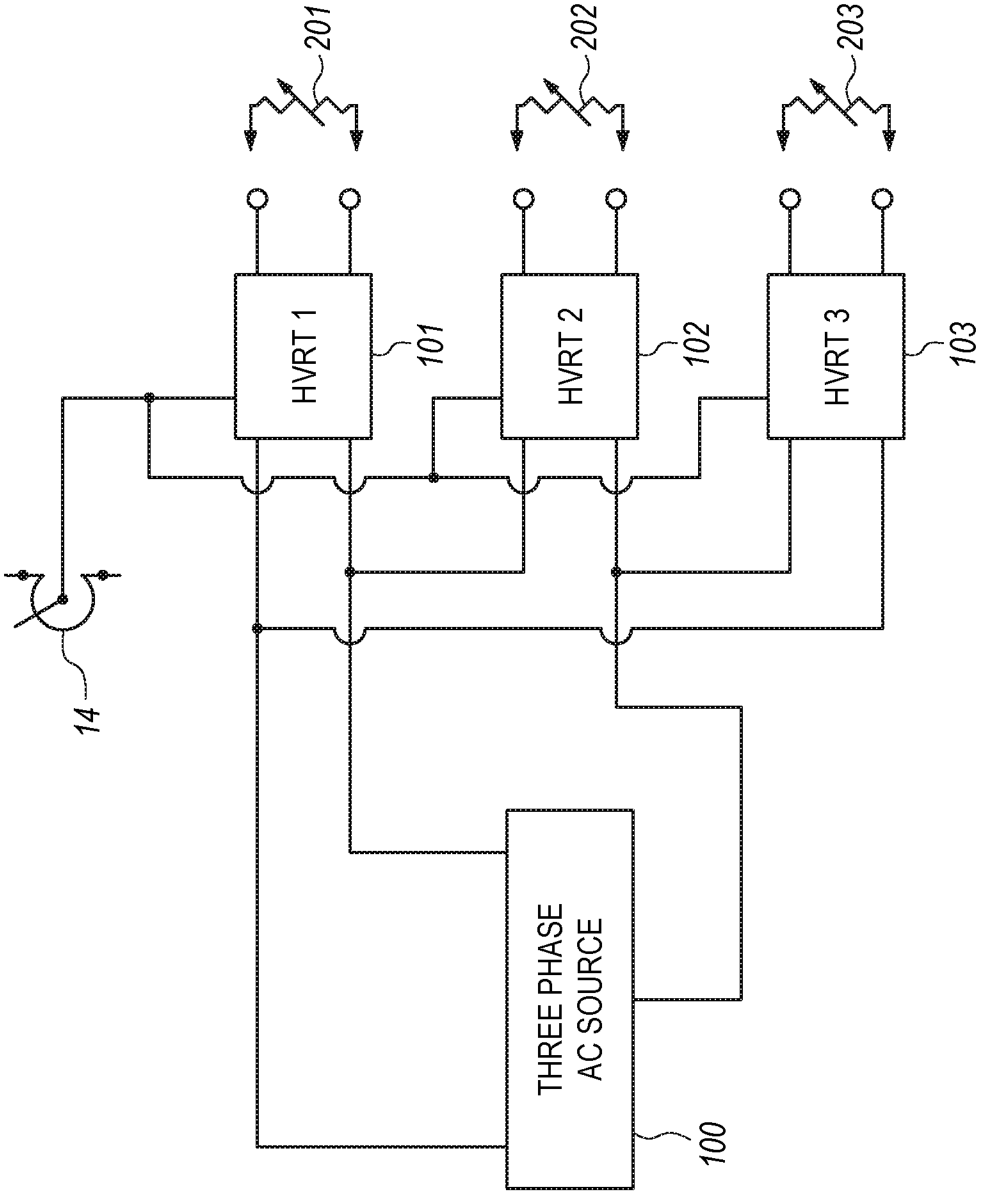
FIG. 10 is a partial diagrammatic illustration of three HVRT transformers constructed in accordance with the invention and connected in a three-phase delta system.

FIG. 10 is a partial diagrammatic illustration of three HVRT transformers arranged in a three phase delta input power configuration. Command reference from potentiometer 14 is connected to HVRT 1 or 101, HVRT 2 or 102 and HVRT 3 or 103. The outputs of these three HVRT transformers can power independent loads 201, 202 and 203 directly of the outputs of 101, 102 and 103 can also be configured to drive loads 201, 202 and 203 in a three phase wye or delta.

The invention claimed is:

1. A hybrid variable reactance transformer comprising:

a main power regulator including a voltage control, an amperage control, and an impedance control;

a transformer with primary, secondary, and impedance windings;

a semiconductor provided on the primary side or the secondary side of the transformer, and controlled by a signal from the main power regulator to vary the voltage and current to a load, the load having a variable power demand;

a current transformer provided on the primary side or the secondary side of the transformer, the current transformer electrically connected to the main power regulator which provides a current signal to the main power regulator; and a variable DC rectifier electrically connected to the impedance winding and electrically connected to the main power regulator whereby the impedance winding produces an impedance signal to the variable DC rectifier, which in turn produces a control signal to the main power regulator such that the main power regulator returns an impedance setting signal to the variable DC rectifier, the variable DC rectifier controlling the impedance in the transformer;

whereby the hybrid variable reactance transformer controls the power supplied to the load based on the load's then-existing power demand.

2. A device according to claim 1, wherein the semiconductor is a set of inverse parallel silicon controlled rectifiers.

3. A device according to claim 1, further comprising a first firing circuit which controls current on the secondary winding through the semiconductor.

4. A device according to claim 1, further comprising a bonding agent that at least partially pots the hybrid variable reactance transformer.

5. A device according to claim 4, further comprising at least one full wrap of coolant tube around and in thermal contact with the potted portion of the hybrid variable reactance transformer.

6. A device according to claim 2, wherein one or more of said primary, secondary, and impedance windings are hollow inside to carry coolant.

7. A device according to claim 3, further comprising a second firing circuit which controls the impedance winding through the variable DC rectifier.

8. A device according to claim 6, wherein said coolant is a refrigerant.

* * * * *